Oct. 1, 1946.  O. D. LUTES  2,408,431
BLIND RIVETING APPARATUS
Filed Feb. 26, 1943  2 Sheets-Sheet 2
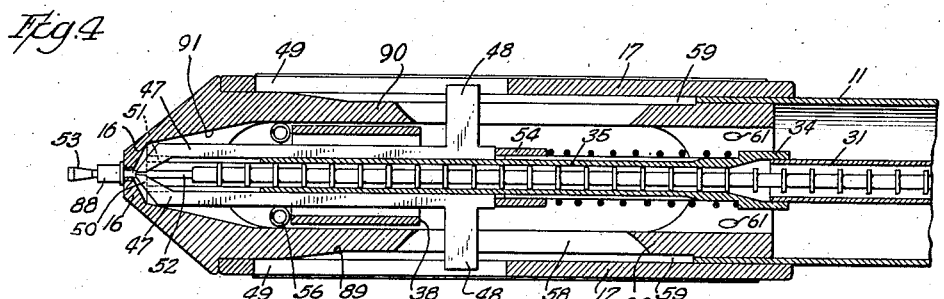
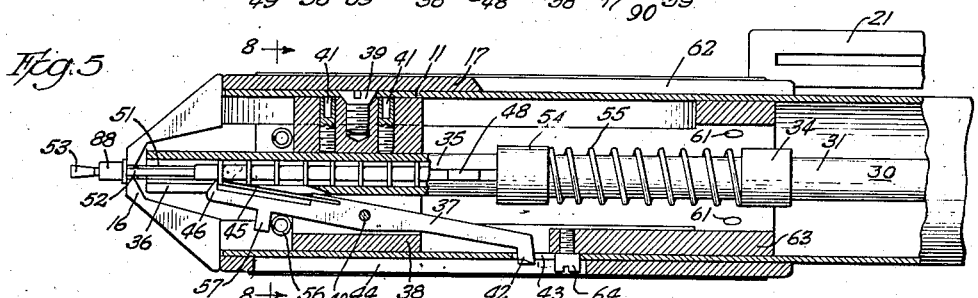
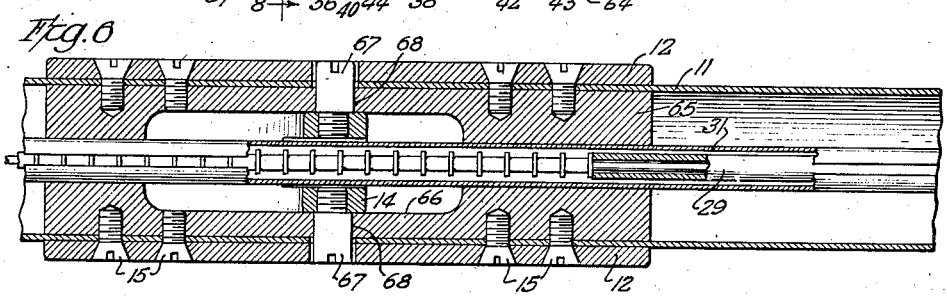
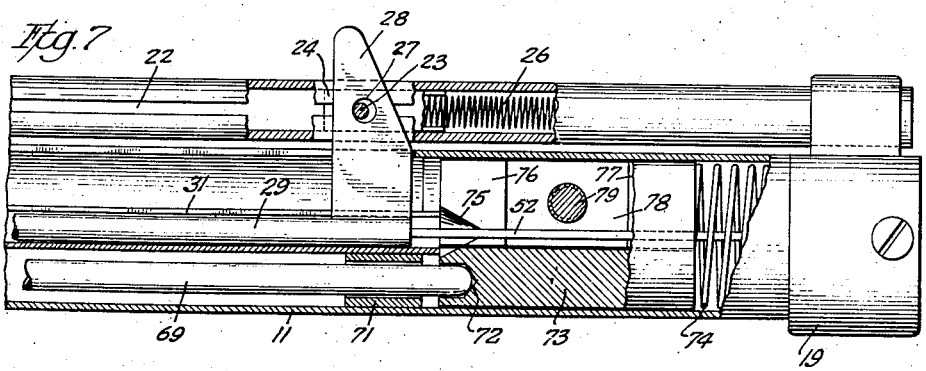
Inventor
Oakley D. Lutes
Alois W. Graf
Atty.

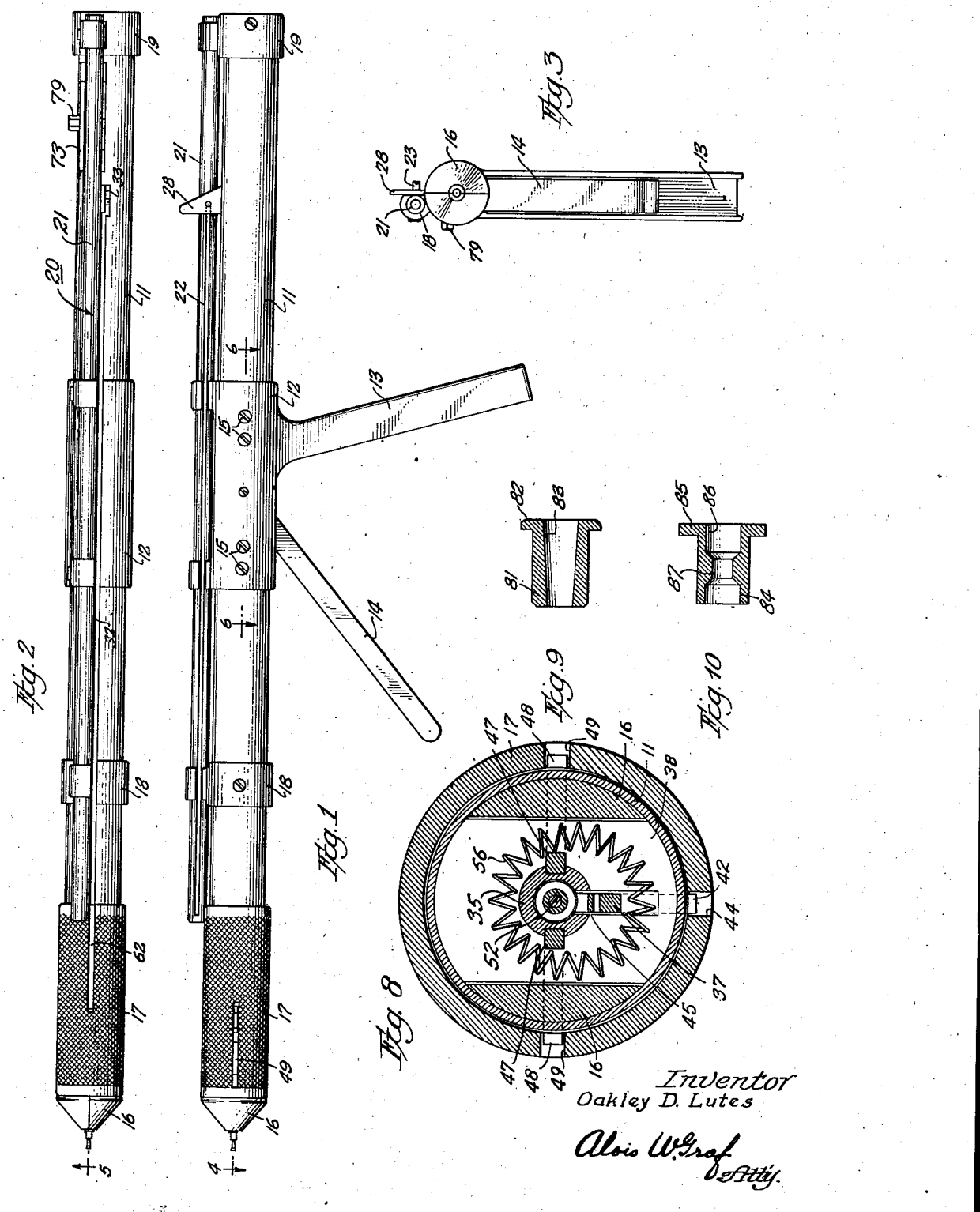

Patented Oct. 1, 1946

2,408,431

UNITED STATES PATENT OFFICE 2,408,431

BLIND RIVETING APPARATUS

Oakley D. Lutes, Jackson, Mich., assignor to Seiden Pneumatic Tool Company, a partnership composed of Oakley D. Lutes and Emory Lutes Application February 26, 1943, Serial No. 477,185

18 Claims. (Cl. 218—19)

My invention relates to a riveting apparatus and more particularly to a blind riveting machine of the repeating type.

Heretofore numerous types of rivets have been provided for securing together a plurality of sheets or plates so that rivets could be applied and driven or set from the same side. Such types of rivets are particularly useful where it is necessary to secure together a plurality of sheets in a position when it is impractical to form by bucking a head or protuberance on the other side of the plate. For example, in various types of aircraft it is not uncommon to find that from between ten and twenty thousand rivets of this type are required for a single plane. Generally rivets suitable for this type of work have been hollow or tubular rivets having a preformed head. The body of such rivet is partially deformed by bulbing or spreading the body. Some of these rivets are provided with internal bulges, restricted passages or tapered holes through which a second member such as a mandrel or a second part of the rivet is drawn. Practically all of the rivets of this type are set one at a time with a tool which is manually reloaded each time that a rivet is to be placed and set. Obviously therefore, it would be highly desirable to provide a tool or mechanism which would have a magazine wherein a quantity of rivets could be stored and fed successively to the work.

While there have been some attempts made at providing a repeating magazine type of blind rivet tool, these have been unsuitable for use with rivets of the type required in the manufacture of aircraft, since these rivets are of aluminum or aluminum alloy which must not be marred or damaged in the slightest or otherwise the rivet will break or fracture at a subsequent time after the aircraft has been in use. Therefore at present, it is common practice to use alloy rivets, some of which must be maintained at a low temperature up to the time of setting, each of which is individually placed in a tool and set. Among the difficulties encountered in attempting to provide repeating rivet feeders is the inability to provide a rivet feeding mechanism which will not mar or injure the surface of the rivet.

In accordance with this invention I provide a repeating blind riveting mechanism which has a rivet feeding mechanism which forwards the rivets one at a time positively and without injury to the surface thereof. This mechanism is provided with a magazine in which a relatively large quantity of rivets is arranged in seriatim, and a feeding mechanism, which precludes the possibility of improper operation, is provided.

It is an object of this invention to provide a blind riveting mechanism of the repeating type which will overcome the above mentioned disadvantages of the prior art.

Another object of this invention is to provide a repeating blind riveting apparatus with a rivet forwarding arrangement which will not mar or otherwise injure the surface of the rivets.

Still another object of this invention is to provide an improved material forwarding mechanism which will handle relatively soft material without marring or deforming the same.

Still another object of this invention is to provide a repeating type of rivet feeding mechanism for blind riveting which will be relatively simple in operation and which is capable of operating at a relatively high speed.

A still further object of this invention is to provide an improved repeating type of blind rivet setting mechanism which is readily loaded, rapid in operation, and convenient to use.

Other and further objects of this invention will become more readily apparent by reference to the following specification taken in connection with the accompanying drawings wherein:

Fig. 1 is a side view of the apparatus comprising my invention;

Fig. 2 is a top view of my invention;

Fig. 3 is a front end view of the apparatus shown in Figs. 1 and 2;

Fig. 4 is a cross-section through the manually actuatable riveting forwarding mechanism along the line 4 of Fig. 1;

Fig. 5 is a cross-section through the riveting forwarding mechanism along the line 5 of Fig. 2;

Fig. 6 is a cross-section through the central portion of the mechanism along the line 6—6 of Fig. 1;

Fig. 7 is a partial cross-sectional view of the rear portion of the mechanism shown in Fig. 1;

Fig. 8 is a cross-sectional view along the lines 8—8 of Fig. 5; and

Figures 9 and 10 show rivets of the type used by the apparatus comprising my invention.

Referring more particularly to Figs. 1, 2 and 3 of the drawings, there is shown a blind riveting mechanism of the repeating type having a frame 11 which is relatively long and preferably of a shape having a circular or oval cross-section. At an intermediate portion, the frame 11 supports a stock member 12 provided with a hand grip 13 and an operating trigger or lever 14. The stock 12 is rigidly secured to the frame 11 by suitable fastening means, such as screws 15. In the forward end of the frame 11, there is fastened a bifurcated anvil 16, and adjacent thereto is a longitudinally movable sleeve or hand grip 17 which is used to activate a rivet forwarding mechanism. A supporting member 18, at a point intermediate the hand grip 17 and the stock 12, together with part of the stock 12 and a supporting member 19 at the end of the frame 11, support part of a riveting following apparatus 20.

The rivet following apparatus 20 includes a tubular member 21 off-set from the center of the gun, as shown in Fig. 3. The tubular member 21 is provided for the greater part of its length with a slot 22, through which a pin 23 projects. The pin 23 is secured to a movable carriage member 24 which is positioned within the tubular frame 21. The carriage member 24 is biased by a compression spring 26 tending to urge forwardly the carriage 24. The pin 23 extends through an aperture 27 in a fin 28 so that the compression spring 26 also urges forwardly the fin. The fin 28 is rigidly secured to the rear end of a tubular member 29, one end of which engages the rearmost rivet of a series of rivets supported within a rivet magazine 30. The fin 28 projects through a longitudinal slot 32 in the frame 11, as shown in Fig. 2. At the rear end of the slot 32, there is an offset slot portion 33 provided so that by tilting the fin 28 in a clockwise direction as viewed in Fig. 3, the fin 28 will be locked in the offset slot portion 33, so as to permit ready reloading of the rivet magazine.

The rivet magazine 30 is formed in two portions, a rear portion 31 and a forward portion 35. The forward end of the rear portion 31 of the magazine 30 terminates within a coupling or joint 34 which is part of the forward magazine portion 35, Figs. 4 and 5. This forward magazine portion 35 terminates just to the rear of the bifurcated anvil 16. On the underside of the riveting magazine portion 35 adjacent the front end, there is provided a slot 36 so that a rivet retaining and escapement member may engage the rivets.

The rivet retaining and escapement member comprises a lever 37 pivotally mounted at an intermediate point 40 within an internal supporting block or member 38. The supporting block 38 is secured to the tubular frame 11 by suitable fastening means, such as a screw 39. The supporting block 38 also serves to support and position the rivet magazine portion 35 which is secured to the block by a plurality of set screws 41. The lever 37 has, at its rear end, a bent portion 42 which is positioned so as to extend through an aperture 43 in the frame 11, and into a longitudinal slot 44 formed in the sleeve or hand grip 17. When the hand grip 17 is moved rearwardly, the forward end of the slot 44 eventually will engage the end of the projection 42 thereby causing it to move about the pivotal support. The forward end of the lever 37 is provided with a resilient or flat spring member 45 which bears against the head of the foremost rivet to prevent retraction thereof and which also presses against the head of the penultimate rivet for a purpose later to be described. The extreme forward end of the lever 37, is formed into a latching means or an escapement hook 46 which engages the preformed head or collar of a rivet. The operation of the escapement hook 46 serves to retain the foremost rivet against premature forward movement as will subsequently become apparent.

At right angles to the plane of the lever 37, as will be seen from Fig. 4, there is provided a pair of forwarding pinchers 47 having adjacent the rear portion thereof transversely extending members 48 each of which projects through a corresponding longitudinal slot 49 formed in the hand grip 17. The jaw portions 50 at the forward end of the pair of pinchers 47 extend through suitable slots 51 in the end of the rivet magazine portion 35. The pinchers 47 are formed so as to substantially surround a rod or wire 52 which passes through the centers of the rivets and through the center of the working surface or bifurcated anvil 16. The forward end of the wire 52 is provided with a mandrel 53 which is adapted to be drawn through the inner tubular passage of a rivet thereby to set the rivet. The pinchers 47 are urged forwardly by a collar 54 which in turn is urged forwardly by a compression spring 55 positioned about a part of the magazine portion 35 between the collar 54 and the coupling 34.

The projecting transversely extending portions 48 of the pinchers 47 are engaged by the forward end of the slot 49 whenever the hand grip 17 is moved rearwardly. The forward ends of the slots 49 engage the projecting members 48 to cause the jaw portions of the pinchers 47 to be retracted. The pinchers 47 in passing over the foremost rivet spread apart in opposition to a helical spring 56 which surrounds both pinchers 47 at an intermediate point thereon and also engages the underside of the retarding and escapement lever 37. From reference to Figs. 4, 5 and 8 it will be seen that this spring 56 thus surrounds these three members. From Fig. 5 it furthermore will be observed that the spring 56 is positioned between the supporting block 38 and a projecting portion 57 depending from an intermediate point on the forward portion of the lever 37. When the hand grip 17 is moved, the laterally projecting members 48 of the pinchers 47 move rearwardly within the slots 58 of the bifurcated anvil members 16 and the slots 59 in the frame 11.

The working surface or bifurcated anvil 16 extends rearwardly to the proximity of the end of the hand grip 17, as seen in Figs. 4 and 5. There the bifurcated anvil portions 16 are secured to the frame 11 by suitable fastening means, such as screws not shown, which extend into suitable threaded screw holes 61, the bottoms of which are visible in these figures. The top of the hand grip 17 is provided with a slot 62 as shown in Figs. 2 and 5 which is in alignment with the vertical slot 32 of the frame 11 so that the hand grip may clear the follower fin 28 at a time when the magazine is nearly empty. Secured to a supporting portion 63 within the tubular frame 11 there is a screw member 64 having a head which fits within the slot 44 and serves as a guide for the hand grip 17 whenever the hand grip is actuated.

Fig. 6 shows in section an intermediate portion of the riveting mechanism, where the frame 11 is surrounded in part by the stock 12. Within the area of the stock 12 inside of the frame 11, there is provided a supporting block 65 which is provided with a hollow portion 66 adjacent the center thereof. The stock 12 and the block 65 are rigidly secured in position to the frame 11 by a plurality of fastening means, such as screws 15. The hand actuating lever or trigger 14 extends through a suitable opening in the bottom of the frame 11 and the block 65 into the hollow portion 66 of the block. The trigger or lever 14 is pivotally supported within the block 65 by a pair of screw bearing members 67 in suitable bearing openings 68 in the block 65. The block 65 also provides an intermediate support for the tubular rivet magazine 31. At a point adjacent the upper end of the arm 14 slightly below the pivot 67 the arm 14 engages one end of a connecting rod 69 shown in Fig. 7.

The connecting rod 69, shown in Fig. 7, passes through a suitable aperture in a guide supporting block 71 positioned within the frame 11 and supporting the rivet magazine 31. The end of the connecting rod 69 fits in a socket 72 formed in a piston-like gripping block 73. The gripping block 73 is biased forwardly by a compression spring 74 positioned between the block and one end of the frame 11. At the forward end of the block 73, there is provided a conical aperture 75 which serves as a guide for receiving the end of the wire or rod 52 whenever a new wire or rod of rivets is being supplied to the magazine. The block 73 is formed in two portions, a major portion comprising substantially three-fourths of a cylinder, and a minor portion comprising the remainder of the cylinder. The minor portion of the cylinder is provided with gripping faces 76 and 77 which are positioned at each end of the block 73 and which are separated by a recessed portion 78 in the minor portion. The gripping portions 76 and 77 in the minor portion of the gripping block are secured in engagement with the major portion of the gripping block 73 by a suitable stud bolt 79. The head of the stud bolt 79 extends through a slot in the back side of the frame 11, Fig. 2, so that the two parts of the gripping block 73 may readily be tightened or loosened from the exterior of the riveting mechanism.

In Figs. 9 and 10 there are shown several rivets representative of the type of rivets which may be readily utilized with a mechanism of this type. In the rivet shown in Fig. 9, the rivet comprises a body 81 having a preformed head 82. The interior bore 83 of this rivet is tapered so that the bore adjacent the preformed head 82 is substantially equal to the maximum diameter of a mandrel, such as the mandrel shown in Figs. 4 and 5.

The rivet shown in Fig. 10 has a body 84 and a preformed head 85. The rear bore 86 is provided with a protuberant ring 87 which is engaged by a mandrel such as 53 which causes the outer surface of the body 84 to bulge. These are but two of many types of rivets which are suitable for operation for a mechanism of this type.

In operation, the riveting mechanism such as shown in Fig. 1 is supported by one hand of the operator gripping the hand grip 13 and the other hand of the operator engaging the hand grip 17. The operator holds the mechanism comfortably much like a light machine gun or automatic rifle when fired from the hip. In the drawings, particularly Figs. 1, 2, 4 and 5, it will be seen that between the mandrel 53 and the bifurcated anvil 16 there is a rivet 88 having a preformed head positioned against the mandrel. The operator then grasps the trigger or lever 14 moving it rearwardly toward the hand grip 13. The action of the hand lever 14 against the connecting rod 69 causes the piston-like gripping block 73, which is in tight engagement with the rod 52, to move the rod 52 and the mandrel 53 at the end thereof toward the back of the mechanism. The mandrel 53 therefore passes through the hollow bore of the rivet 88 causing a bulging or upsetting of that portion of the rivet protruding beyond the plates which are to be joined by the rivet. The mandrel 53 passes entirely through the rivet 88 and through the opening in the front of the bifurcated anvil 16. In so doing it may retract the pinchers 47 slightly against the force of the spring 55. Thereupon the mechanism is moved away from the upset rivet and the lever 14 is released permitting the spring 74 to return the mandrel 53 to its forwardmost position.

The next operation performed by the operator is the rearward movement of the hand grip 17 which moves rearwardly the rivet forwarding pinchers 47. The activating sleeve or grip 17 is limited in its rearward motion by the support 18 which serves as an adjustable stop therefor.

The first action occurring as a result of the rearward motion of the sleeve or hand grip 17 is the spreading of the anvils 16 as the front end of the sleeve 17 passes rearwardly along the cam surfaces 89 of the anvils. The inherent resiliency of the rear portions 90 of the anvil 16 causes the bifurcated anvil portions to spread apart. As the anvils spread and open, the forward end 50 of the pinchers 47, under the urging of the spring 55, follows the inner contour of the bifurcated anvil 16 until the forward end 50 projects at least slightly beyond the plane occupied by the face of the closed anvil 16, the forward movement of pinchers 47 ceasing when the arms 48 contact the front end of the slots 58. After the forward end of the sleeve or hand grip 17 clears the cam surface 89 of the anvil 16, the sleeve may move a certain distance before the forward ends of any of the slots 44 and 49 engage any other mechanism. The first mechanisms to be engaged are the laterally extending portions 48 of the pinchers 47 which are engaged by the ends of the slots 49. Further rearward movement of the sleeve 17 causes the front ends of the pinchers 47 to be moved rearwardly to a position just back of the flange of the foremost rivet. In so doing the internal cam surfaces of pinchers 47 ride over the flange of the foremost rivet despite the contractive force exerted by the spring 56. The foremost rivet on the mandrel rod 52 is in engagement with the escapement hook 46 of the lever 37 which prevents its forward movement despite the urging of the spring 26, and with the flat spring 45 which prevents its rearward movement as the pinchers 47 ride over its flange and thereafter close back of said flange and simultaneously attain substantially their maximum rearward position. Slightly before, or substantially simultaneously as, the hand grip 17 is moved to its rearmost limit, which is controlled by stop 18, the forward edge of the slot 44 engages the bent portion 42 of the lever 37 causing the lever 37 to pivot and thus to move an escapement catch 46 away from the preformed head of the foremost rivet. When the foremost rivet has been released by the escapement catch 46 the rivet follower mechanism, which comprises the tube 29, the fin 28, the pin 23, the movable carriage member 24, is activated by the spring 26. The action of the spring 26 is such as to cause a forward motion of all of the rivets on the mandrel rod or wire 52 thus projecting the foremost rivet forwardly of the finger 46. The penultimate rivet does not go beyond the end 46 of the lever 37 but advances only until its flange contacts the inner cam faces of the pinchers 47 because of a retarding action by the spring 45 of the lever 37 and the fact that the spring 26 is not strong enough to spread the pinchers 47 against the retracting force of the encircling spring 56, as would be required to move the penultimate rivet beyond the pinchers 47. Thus the penultimate rivet moves forwardly only an amount sufficient to bring its flange into contact with the inner cam faces of the pinchers 47.

From its rearmost position the hand grip 17 then is permitted to move forwardly and after a short forward movement the forward end of the slot 44 disengages the bent portion 42 of the lever 37 so that the escapement catch 46 moves upwardly, under the action of the circumferential spring 56, to engage the shank of the penultimate rivet. During this slightly forward movement of the sleeve 17, the pinchers 47 engage the back of the foremost rivet head and move the rivet forwardly under the action of the spring 55. During this forward movement the spring 26 maintains the flange of the penultimate rivet in contact with the inner cam surfaces of the pinchers 47 until the flange contacts the detent 46 whereupon the spring 45 snaps in behind said flange. Further forward movement of the sleeve 17 permits the pinchers 47 to move the rivet head out beyond the plane normally occupied by the face of the anvils when in closed position, the forward movement of the pinchers being limited by the position of the front ends of the slots 58, or by contact of the shank of the rivet with the mandrel head 53 if one rivet happens to be a bit longer than another. The sleeve 17 thereafter is moved farther forwardly so that the forward ends of the slot 49 are disengaged from the laterally extending extremities 48 of the pinchers 47. The pinchers 47, therefore, have moved the rivet head through the open bifurcated anvil to a point ahead of the anvil face or surface. Upon further forward movement of the sleeve 17 the forward edges of the sleeve engage the cam surfaces 89 of the anvil 16 so as to bring about the closure of the anvil whereupon the steep foremost portion of inner surfaces 91 of the bifurcated anvil engage the outer contours of the pinchers 47 so as to cause the pinchers 47 to move inwardly within the mechanism in opposition to the action of the spring 55. When the hand grip 17 has reached its furthermost forward position, the two halves of the anvil 16 are closed together and locked in position about the wire rod 52. If during the latter operation, the mechanism has been tilted forwardly the rivet 88 will have moved down the wire 52 by gravity to engage the mandrel 53. If such is the case the rivet 88 may be moved back against the face of the anvil 16 by tilting the forward end of the mechanism upwardly or by insertion of the rivet into the rivet hole in the work. The cycle is thus completed and the handle 14 is ready to be again actuated when the rivet 88 has been inserted in the work piece to draw the mandrel 53 through the rivet 88 in the manner set forth above at the beginning of the statement of operation.

Whenever it is desired to reload the mechanism with a new supply of rivets, the fastening bolt 79 which engages the block 73 is loosened to permit the withdrawal of the rod 52 and the mandrel 53. A new rod and mandrel provided with a supply of rivets thereon is provided for insertion into the mechanism. The fin 28 of the rivet following mechanism is then locked in the recess 33. Next the hand grip 17 is moved rearwardly until the forward end of the slot 44 is about to engage the extremity 42 of the lever 37. The end 42 of the escapement lever 37 is then manually actuated by insertion of a tool or coin in the slot 44 so as to move the lever 37 a greater amount than the normal movement of the lever 37 by the action of the grip 17. This additional movement of the lever 37 is brought about to move the spring 45 out of the path of the rivets which are to be inserted in the magazine. As a result of this rearward movement of the hand grip 17, the anvil 16 is separated and the pinchers 47 project forwardly of the open jaws 16 and may be manually separated thus leaving an opening through which the rivets on a wire 53 may be inserted into the magazine 30. The end of the wire 53 engages the conical opening 75 of the gripping block 73 so that the wire is properly positioned in the gripping block. The mandrel rod 52 is pushed into the gripping block 73 until the foremost rivet while having its shank in contact with the mandrel head 53 has its head only a trifle in front of the jaws 16. Thereupon the bolt 79 is fastened to secure the wire in position so that normal movement of the block 73 will draw the mandrel 53 through a rivet. Thereafter the tool is tilted so that the flange of the foremost rivet slides back of detent 46, after which said detent is released. (There must not be placed on the mandrel so many rivets as to prevent the flange of said foremost rivet from sliding to the back of detent 46.) The fin 28 of the rivet following mechanism is then released from the catch 33 to cause the follower 29 to press upon the column of rivets and thereby bring the flange of the foremost rivet into contact with detent 46 and permit spring 45 to snap back of said flange. Thereafter handgrip 17 is pulled to its rearmost position to place the ends of the pinchers 47 back of the flange of the foremost rivet, and to release said foremost rivet from the detent 46, after which forward movement of the handgrip 17 feeds said foremost rivet to a position in front of the jaws 16 and closes said jaws back of said rivet. The mechanism then is ready for operation.

While my invention has been shown, for ease of description and explanation, as embodied in a particular structure, it is to be understood that variations may be made therein, commensurate with the scope of my invention as defined in the appended claims.

What I claim as new and desire to secure by Letters Patent is:

1. A blind riveting mechanism comprising a frame supporting therein a rivet magazine, a bifurcated anvil supported at one end of said frame and biased toward open position, a mandrel for expanding rivets, a wire, an actuating block therefor, said mandrel being supported by one end of said wire and said wire extending through said magazine and terminating in said actuating block, a rivet escape and brake mechanism including a detent, a rivet forwarding means including reciprocating pinchers for separating the foremost rivet from a series of rivets mounted on said wire, a reciprocable actuating mechanism operating to close said bifurcated anvil, to release said escape mechanism detent, and to actuate said pinchers, and means for engaging said actuating block to draw said mandrel toward and through said bifurcated anvil.

2. A blind tubular riveting mechanism comprising a frame, a rivet magazine supported at each end thereof by said frame, said magazine comprising a tubular member provided with a longitudinal slot, a mandrel for expanding rivets, a bifurcated anvil cooperating with said mandrel, a wire, a wire gripping block, said mandrel being mounted at the end of said wire and said wire extending through said rivet magazine, said wire being supported adjacent one end of said magazine by said gripping block, a rivet follower positioned within said magazine and having a member extending through the slot thereof, spring biased means operable on said member to urge said follower towards said anvil, and means operable against said gripping block for drawing said mandrel through a rivet supported on said anvil.

3. A blind riveting mechanism comprising a frame, a rivet magazine supported at each end therein, said magazine comprising an elongated chamber provided with a longitudinal slot, a rivet follower positioned within said magazine and having a member extending through the slot thereof, spring biased means operable on said member to urge said rivet follower towards said anvil, a mandrel for expanding rivets, a wire supporting at one end said mandrel, a bifurcated anvil supported at one end of said frame and cooperating with said mandrel, said mandrel wire extending through said rivet magazine and being supported at the other end thereof adjacent said magazine by a reciprocable gripping block, and means operable against said gripping block for drawing said mandrel through a rivet supported on said anvil.

4. A blind riveting mechanism comprising an elongated hollow frame, an elongated magazine for a series of tubular rivets, said magazine being supported within said frame, a spring biased bifurcated anvil supported adjacent one end of said frame, a mandrel adjacent said anvil, a mandrel actuating block, a wire extending through said magazine and interconnecting said mandrel and said actuating block, a rivet escape and brake mechanism, a rivet forwarding means including reciprocating pinchers for separating the foremost rivet from a series of rivets mounted on said wire, a reciprocable actuating mechanism operating to release said bifurcated anvil to open position and to close said anvil, to actuate said escape mechanism, and to actuate said pinchers, and means for engaging said actuating block to draw said mandrel toward and through said bifurcated anvil.

5. A blind riveting mechanism comprising a rigid frame, a bifurcated anvil supported adjacent one end of said frame, a reciprocable mandrel cooperating with said anvil, a longitudinal magazine containing a row of tubular rivets, means for releasing only the foremost rivet at a time, means for retarding the remaining rivets, means for engaging said released rivet and for advancing said rivet beyond said anvil, and means for actuating said mandrel, including a member extending from said mandrel through said magazine to the other end of said frame, and a reciprocable member affixed to said first member.

6. A repeating riveting mechanism comprising an elongated hollow frame, a handle and an operating level therefor located at an intermediate point thereon, a bifurcated anvil at one end of said frame, a magazine supported longitudinally within said frame, said magazine being provided with a longitudinal slot, a rivet following mechanism supported by said frame and engaging a member extending from said magazine through said slot, means adjacent said anvil and one end of said magazine for supplying a single rivet to said anvil, a wire extending from the face of said anvil to the other end of said frame, a mandrel attached to the end of said wire adjacent said anvil, and means connected to the other end of said wire and with said lever for drawing said mandrel through a rivet.

7. In a riveting mechanism the combination comprising a magazine adapted to contain a row of rivets, an anvil, a rivet forwarding mechanism associated with said anvil and said mechanism including a reciprocable actuating member, a pair of pincher-like members adapted to be actuated thereby, said members being arranged between said anvil and said magazine to engage the foremost rivet and forward said rivet to said anvil, and a rivet releasing and retarding mechanism positioned at right angles to said pincher members, said latter mechanism engaging the foremost rivet in said mechanism and being actuated by said reciprocable actuating member.

8. In a repeating riveting mechanism, the combination comprising a magazine adapted to contain a row of rivets, a bifurcated anvil, a rivet forwarding mechanism associated with said anvil and said mechanism including a reciprocable sleeve actuating member surrounding a portion of said anvil, said sleeve being provided with a plurality of circumferentially spaced longitudinal slots each adapted to actuate a portion of said mechanism, a pair of pincher-like members adapted to be actuated by certain of said slots, said members being arranged between said anvil and said magazine to engage the foremost rivet and to forward said rivet to said anvil, and a rivet releasing and retarding mechanism engaging the foremost rivet in said magazine and being arranged to be actuated by another slot of said reciprocable actuating sleeve member.

9. A repeating riveting mechanism comprising an elongated hollow frame, a handle therefor attached at an intermediate point thereon, an anvil located at one end of said frame, a rivet magazine supported longitudinally within said frame, said magazine being provided with a slot, a rivet following mechanism supported by said frame and having a member extending into said magazine through said slot, means adjacent said anvil and one end of said magazine for supplying the foremost rivet to said anvil, a wire extending from the face of said anvil to a point beyond the other end of said magazine, a mandrel attached to the end of said wire adjacent said anvil, and means connected to the other end of said wire for directing said mandrel through a rivet.

10. In a riveting mechanism, the combination comprising a longitudinal magazine containing a series of rivets, a bifurcated anvil positioned ahead of said magazine, means biasing said anvil toward open position, rivet following means for urging said rivets toward said anvil, means engaging the first two rivets of said series and operable to disengage the foremost rivet, a pincher-like mechanism for engaging the disengaged rivet to forward said rivet to said bifurcated anvil, and a reciprocable sleeve surrounding said aforementioned elements and adapted upon actuation thereof to permit said anvil to open, said sleeve actuating said rivet engaging means and said pincher-like mechanism thereby to cause a single rivet to be supplied to said anvil.

11. In a riveting mechanism, the combination comprising a longitudinal magazine for a series of rivets, a bifurcated anvil positioned adjacent one end of said magazine, means biasing said anvil toward open position, means for releasing only the foremost rivet from said magazine and for engaging a released rivet and for forwarding said rivet to said anvil, and a reciprocable sleeve surrounding said anvil and having means thereon for holding said anvil closed and permitting the said anvil to open, said sleeve actuating said rivet releasing means and said rivet forwarding mechanism thereby to permit a single rivet to be supplied to said anvil when said sleeve is reciprocated.

12. A riveting mechanism comprising a frame supporting at one thereof an anvil, a reciprocable mandrel cooperating with said anvil for setting rivets, a rivet magazine supported within said frame and having one end positioned adjacent said anvil, a rivet following mechanism associated with said magazine, means for engaging the foremost rivet adjacent said anvil to oppose the action of said rivet following mechanism, means to forward to said anvil the foremost rivet in said magazine, means for actuating said mandrel, and means for releasing said rivet engaging means and for actuating said rivet forwarding means.

13. The combination comprising a working surface, a magazine containing a series of individual members of material, a spring urging said members towards said working surface, means for preventing said members from reaching said working surface and for releasing said members one at a time, means for retarding the remaining members whenever one member is released, means for engaging a released member to forward said member to said working surface, and reciprocable means for successively actuating said aforementioned means to supply a single member of material to said working surface.

14. The combination comprising a working surface, a longitudinal magazine containing a series of individual members of material, said magazine having one end in the proximity of said working surface, a spring urging said members towards said end, latching means for engaging the first member of said series and for releasing said members one at a time, means for retarding the remaining members whenever one member is released, means for engaging and forwarding a released member to said working surface, and reciprocable means for successively actuating said aforementioned means.

15. The combination comprising a work surface, a longitudinal magazine containing a series of individual members of material, one end of said magazine being located in the proximity of said work surface, a spring urging said members towards said end, means for engaging the first member of said series for preventing said members from being moved by said spring, said engaging member being adapted to be actuated to release said member of material, means engaging the second member of said series for retarding the remaining members whenever the first member is released, means for engaging and forwarding a released member to said work surface, and reciprocable means for successively actuating said aforementioned means.

16. In a repeating mechanism, the combination of a member having working surface, a magazine containing a series of members of material spring biased toward said working surface and adapted to be supplied thereto one at a time, and a material member forwarding mechanism interconnecting said working surface and said magazine, said forwarding mechanism including means engaging the foremost material members in said magazine to restrain said material members and adapted upon actuation to release one material member at a time, means displaced at right angles from said first means for engaging a released material member and for forwarding said material member to said working surface, and a reciprocable member surrounding portions of said working surface member and said magazine for actuating the elements of said forwarding mechanism.

17. In a repeating mechanism, the combination of a member having working surface, a magazine containing a series of members of material to be supplied to said surface, and a material member forwarding mechanism interconnecting said working surface and said magazine, said forwarding mechanism including means engaging and restraining the foremost material members in said magazine and adapted upon actuation to release one material member at a time, means angularly displaced from said first means for engaging and forwarding a released material member to said working surface, and a reciprocable sleeve surrounding portions of said working surface member and said magazine and adapted upon reciprocation to actuate the elements of said forwarding mechanism.

18. A mechanism comprising a frame supporting a bifurcated anvil, a reciprocable mandrel cooperating with said anvil, a longitudinal magazine for containing a row of individual members of material, pivotally mounted means for releasing at least the foremost of said members, leaf spring means for retarding the remaining members of material, means for engaging a released member and for advancing said member beyond said anvil, and means for actuating said mandrel.

OAKLEY D. LUTES.